US007515986B2

(12) United States Patent
Huskamp

(10) Patent No.: US 7,515,986 B2
(45) Date of Patent: Apr. 7, 2009

(54) METHODS AND SYSTEMS FOR CONTROLLING AND ADJUSTING HEAT DISTRIBUTION OVER A PART BED

(75) Inventor: Christopher S. Huskamp, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 11/737,962

(22) Filed: Apr. 20, 2007

(65) Prior Publication Data

US 2008/0262659 A1 Oct. 23, 2008

(51) Int. Cl.
*G06F 19/00* (2006.01)
*G05D 23/00* (2006.01)
*A61N 5/00* (2006.01)
*G21G 5/00* (2006.01)
*B29C 35/08* (2006.01)
*H05B 6/00* (2006.01)
*G01J 5/00* (2006.01)

(52) U.S. Cl. .................... 700/207; 700/119; 700/121; 700/300; 219/405; 219/483; 250/492.2; 264/497; 374/131

(58) Field of Classification Search ............ 700/118, 700/119, 121, 207, 212, 299, 300; 219/121.61, 219/121.65, 405, 482, 483, 486; 250/492.1, 250/492.2; 264/40.1, 40.6, 128, 497; 374/130, 374/131; 399/69; 427/8–10; 432/36
See application file for complete search history.

(56) References Cited

U.S. PATENT DOCUMENTS

| 4,479,604 | A | * | 10/1984 | Didner ................. 236/49.3 |
|---|---|---|---|---|
| 4,605,161 | A | * | 8/1986 | Motomiya et al. ...... 236/15 BC |
| 4,682,011 | A | | 7/1987 | Hoffmann et al. |
| RE33,245 | E | * | 6/1990 | Tojyo et al. ............ 374/131 |
| 5,155,321 | A | | 10/1992 | Grube et al. |
| 5,258,601 | A | * | 11/1993 | Takano ................. 219/486 |
| 5,278,938 | A | | 1/1994 | Spigarelli et al. |
| 5,304,329 | A | * | 4/1994 | Dickens et al. ......... 264/497 |
| 5,352,405 | A | | 10/1994 | Beaman et al. |
| 5,411,074 | A | * | 5/1995 | Naruse et al. .......... 164/4.1 |
| 5,458,476 | A | | 10/1995 | Medwin |
| 5,593,608 | A | * | 1/1997 | Suzuki ................. 219/492 |
| 5,603,772 | A | * | 2/1997 | Ide ...................... 118/724 |
| 5,630,714 | A | * | 5/1997 | Yuino et al. ............ 432/36 |
| 6,080,965 | A | * | 6/2000 | Osawa .................. 219/405 |
| 6,121,579 | A | * | 9/2000 | Aoki et al. ............. 219/390 |
| 6,122,437 | A | | 9/2000 | Johnson |

(Continued)

FOREIGN PATENT DOCUMENTS

JP 56038435 A * 4/1981

(Continued)

*Primary Examiner*—Crystal J Barnes Bullock
(74) *Attorney, Agent, or Firm*—Lee & Hayes, PLLC

(57) ABSTRACT

Methods and systems for controlling and adjusting heat distribution over a part bed are disclosed. In one embodiment, a technique for providing a calibrated heat distribution over a part bed includes determining the temperature distribution within a part bed, generating a zone heat distribution for a plurality of heat zones from the temperature distribution, analyzing the zone heat distribution to create an adjustment command to calibrate a heater for providing a substantially consistent temperature distribution within the part bed, and adjusting the heater based on the adjustment command.

20 Claims, 6 Drawing Sheets

U.S. PATENT DOCUMENTS

| | | | |
|---|---|---|---|
| 6,600,129 B2 * | 7/2003 | Shen et al. | 219/121.61 |
| 6,643,477 B2 * | 11/2003 | Mitsuoka et al. | 399/69 |
| 6,815,636 B2 * | 11/2004 | Chung et al. | 219/121.65 |
| 6,822,194 B2 | 11/2004 | Low et al. | |
| 6,905,645 B2 * | 6/2005 | Iskra | 264/128 |
| 6,930,278 B1 | 8/2005 | Chung et al. | |
| 6,940,046 B2 | 9/2005 | Dragon | |
| 6,975,917 B2 * | 12/2005 | Sakamoto et al. | 700/121 |
| 6,992,306 B2 * | 1/2006 | Honda et al. | 250/492.2 |
| 7,197,239 B1 | 3/2007 | Grande | |
| 7,362,344 B2 * | 4/2008 | Kama | 347/140 |
| 7,416,641 B2 * | 8/2008 | Denison | 202/99 |
| 7,454,262 B2 * | 11/2008 | Larsson | 700/119 |
| 2003/0222066 A1 | 12/2003 | Low et al. | |
| 2004/0021256 A1 | 2/2004 | DeGrange et al. | |
| 2004/0026807 A1 * | 2/2004 | Andersson et al. | 264/40.1 |
| 2004/0200816 A1 | 10/2004 | Chung et al. | |
| 2004/0254665 A1 | 12/2004 | Fink et al. | |
| 2005/0242473 A1 * | 11/2005 | Newell et al. | 264/497 |
| 2005/0278061 A1 | 12/2005 | DeGrange et al. | |
| 2006/0214335 A1 | 9/2006 | Cox | |
| 2007/0196561 A1 * | 8/2007 | Philippi et al. | 427/8 |

FOREIGN PATENT DOCUMENTS

| | | | |
|---|---|---|---|
| JP | 62020308 A | * | 1/1987 |
| JP | 03021831 A | * | 1/1991 |

* cited by examiner

METHODS AND SYSTEMS FOR CONTROLLING AND ADJUSTING HEAT DISTRIBUTION OVER A PART BED

CROSS REFERENCE TO RELATED APPLICATION

This patent application is related to co-pending, commonly-owned U.S. patent application Ser. No. 11/738,016 entitled "Methods And Systems For Direct Manufacturing Temperature Control", filed on Apr. 20, 2007, which application is hereby incorporated by reference.

FIELD OF THE INVENTION

The invention relates to methods and systems for adjusting heat distribution, and more specifically, to methods and systems for controlling and adjusting heat distribution over a part bed.

BACKGROUND OF THE INVENTION

People often desire to create prototypes or production models of products, including products with complex geometries. Additive manufacturing techniques facilitate the creation of products using a bottom-up product building approach by adding material in thin layers to form a product. This process allows product creation without large capital investments, such as those associated with molds or specialized machinery, while reducing the overall waste generated in product creation. Additive manufacturing techniques also allow creation of a product with complex geometry because the additive process creates a thin cross-sectional slice of the product during each iteration, thus building complex geometries as simple two-dimensional layers created upon one-another.

When a product is formed using an additive manufacturing process, the raw material (e.g., powder) is heated to an optimal temperature for product formation. The optimal temperature is slightly lower than the liquid state temperature of the material, thus allowing a small concentration of thermal energy (heat) from a laser to transform the solid material to a liquid, where the material then bonds and quickly cools (after removal of the laser) as a product layer. Often, the material in the part bed has inconsistent temperature when the temperature is measured across the part bed. This variance in temperature may reduce the integrity and consistency of the product formation process in additive manufacturing. In addition, the raw materials that may be used in additive manufacturing have various formation temperatures (i.e., melting points). Some raw materials have melting points that are too high for current additive manufacturing systems to utilize, particularly when large variances in temperature exist across the part bed.

SUMMARY

Embodiments of methods and systems for controlling and adjusting heat distribution over a part bed are disclosed. In one embodiment, a method for providing a target heat distribution over a part bed includes determining a temperature distribution within a part bed, generating a zone heat distribution for a plurality of heat zones from the temperature distribution, analyzing the zone heat distribution to create an adjustment command to adjust a heater for providing a target (uniform or non-uniform) temperature distribution within the part bed, and adjusting the heater based on the adjustment command.

In another embodiment, a system for providing a target heat distribution over a part bed includes a thermal imaging device to generate temperature distribution data from material in a part bed. A processor receives the temperature distribution data, converts the temperature distribution data into a zone temperature grid, creates a heater control command based on a difference between a target temperature and the zone temperature grid, and transmits the heater control command to at least one heater element of a plurality of heater elements.

In yet another embodiment, one or more computer readable media comprise computer-executable instructions that, when executed by a computer, perform acts which include measuring a temperature distribution of a part bed, generating temperature zones from the temperature distribution, and creating a heater adjustment command from the temperature zones to adjust at least one of a plurality of heaters to provide a target (uniform or non-uniform) temperature distribution over the part bed.

The features, functions, and advantages can be achieved independently in various embodiments of the present inventions or may be combined in yet other embodiments.

BRIEF DESCRIPTION OF THE DRAWINGS

Embodiments of systems and methods in accordance with the present disclosure are described in detail below with reference to the following drawings.

DETAILED DESCRIPTION

Methods and systems for controlling and adjusting a heat distribution over a part bed are described herein. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without several of the details described in the following description.

Figure 1:
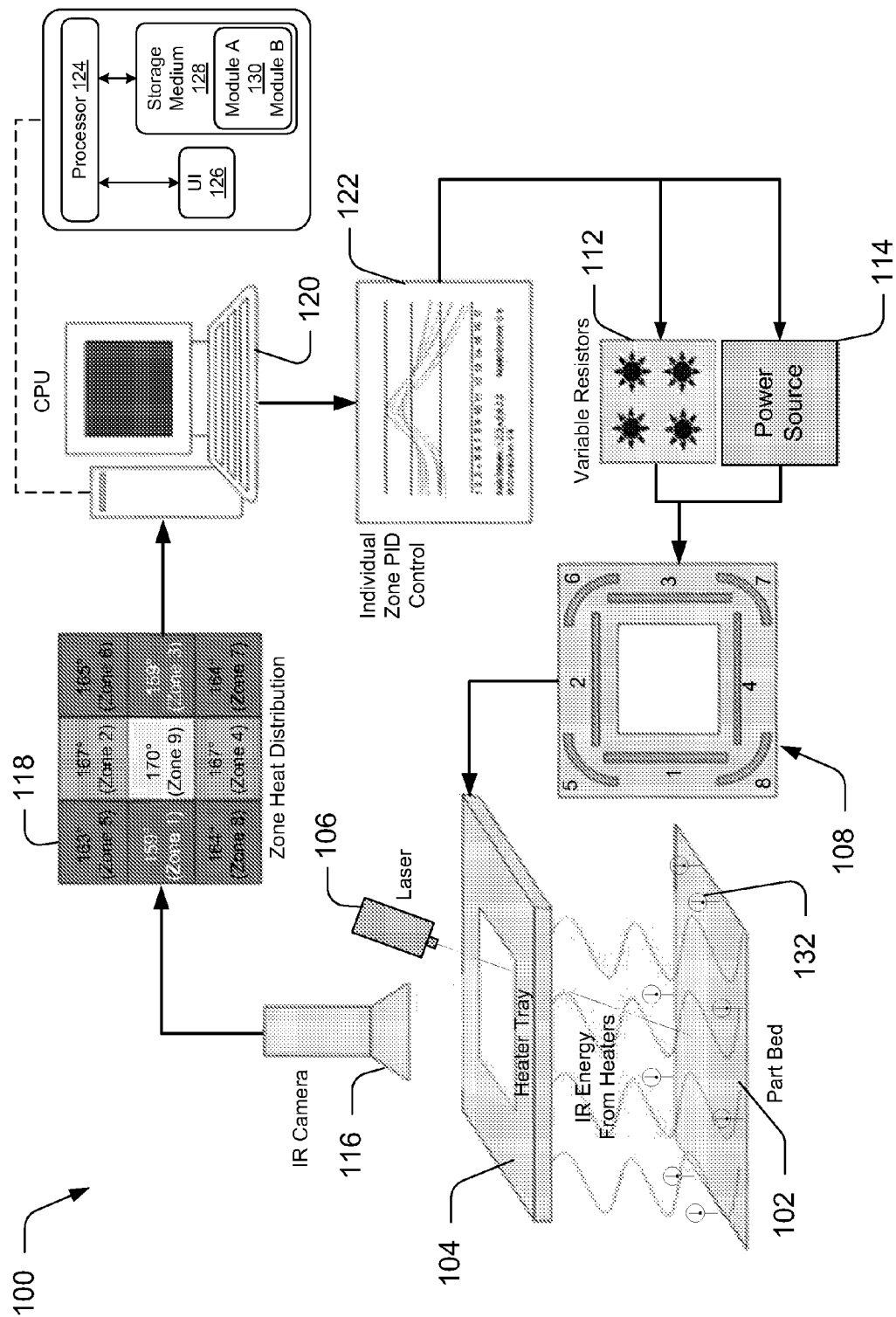
FIG. 1 is a schematic of an environment for controlling and adjusting heat distribution over a part bed in accordance with an embodiment of the invention.
Figure 2:
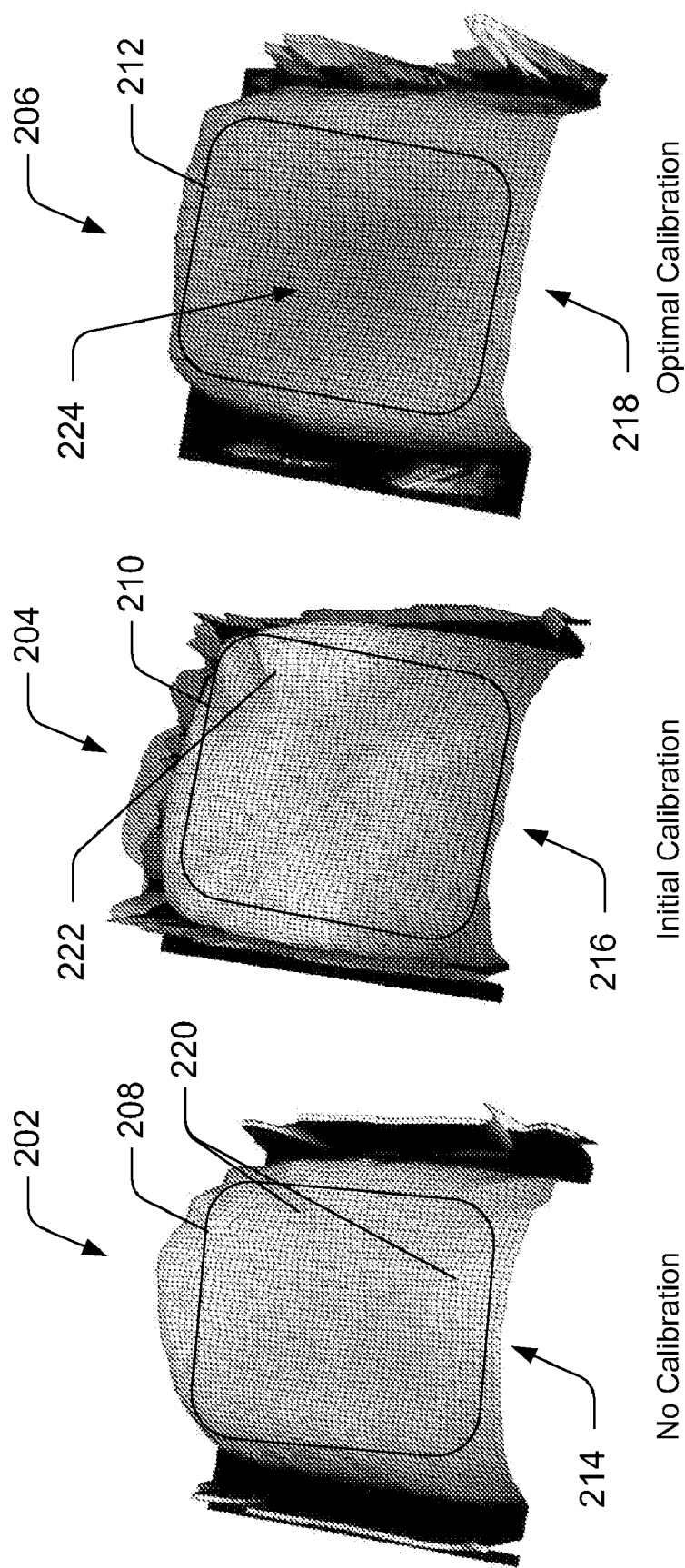
FIGS. 2a, 2b, and 2c are charts illustrating different temperature distribution ranges for a part bed in accordance with an embodiment of the invention.
Figure 3:
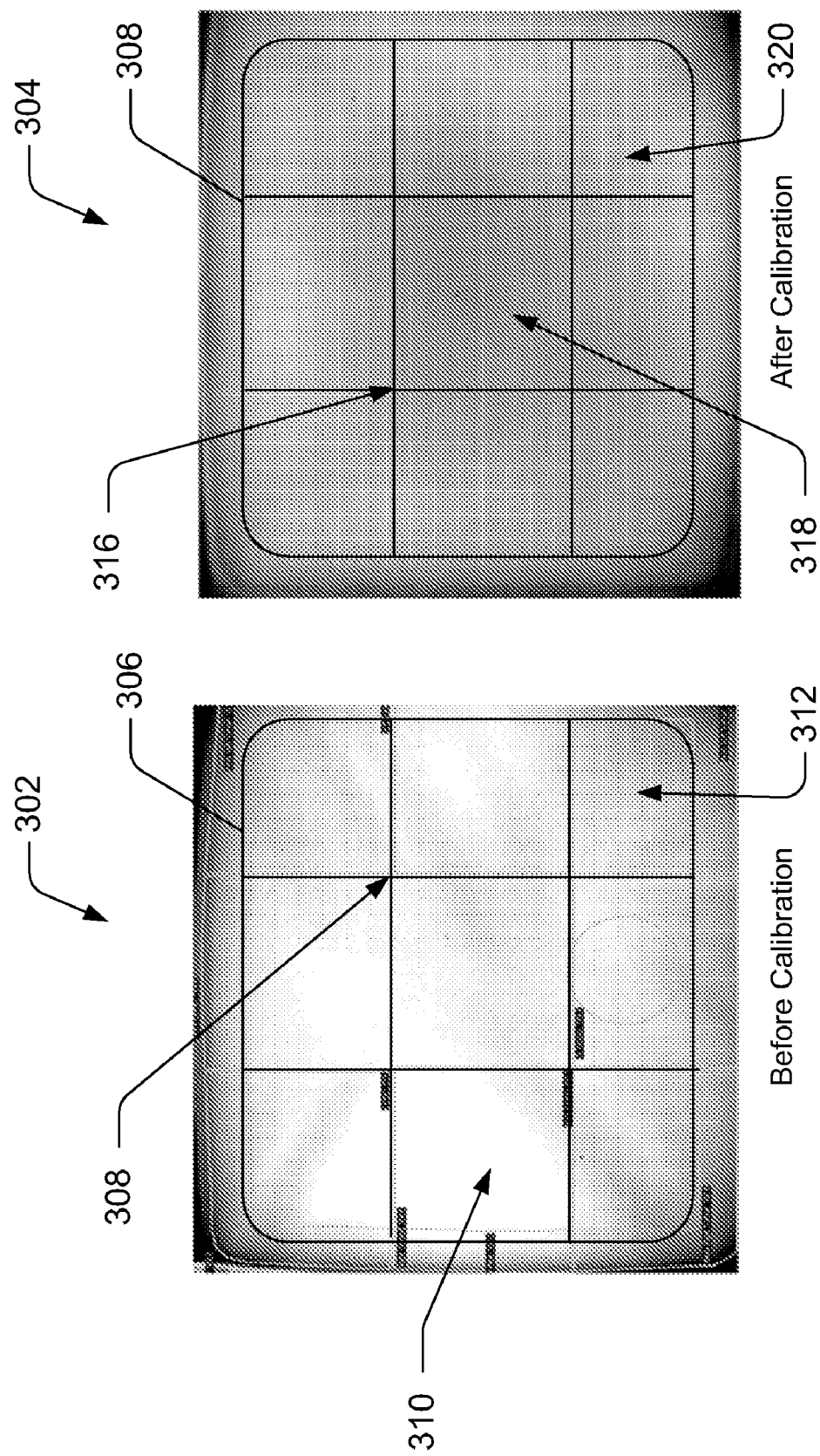
FIG. 3a and 3b are top plan views from an IR camera perspective of temperature distributions of a part bed, including zones of the part bed, in accordance with another embodiment of the invention.

FIG. 1 illustrates an overall environment 100 for controlling and adjusting a heat distribution over a part bed in accordance with an embodiment of the invention. The environment 100 includes a part bed 102 and a heater tray 104 for heating the part bed 102. The part bed 102 (also referred to as a powder bed) is used to create products in an additive manufacturing process such as laser sintering (LS) or selective laser sintering (SLS), a registered trademark of 3D Systems, Inc. of Rock Hill, S.C., USA.

Generally, in an LS system, a thin layer of powder is spread across the part bed 102. The layer of powder is heated by the heater tray 104 to an optimal product formation temperature. A laser beam from a laser 106 is directed at the powder on the part bed 102 to form a layer of the desired product from the powder. As noted above, with the powder heated by the heater tray 104 to a temperature slightly lower than the liquid state temperature of the powder, thermal energy (heat) from the laser 106 transforms the solid material to a liquid. After the laser is removed, the material cools and re-solidifies. The laser 106 bonds the powder elements to form a solid, thin product layer, one layer at a time. After the thin product layer (or slice) has been formed, another thin layer of powder is spread across the part bed 102 to create another thin product layer of the product on top of the previous thin product layer. This process is repeated until the desired product is fully formed, often after many iterations of the above-described process. Embodiments of systems and methods in accordance with the teachings of the present disclosure may advantageously be used to provide a desired temperature distribution over the powder in the part bed 102 (including uniform or non-uniform temperature distributions), thereby improving the consistency of the manufacturing process and the quality of the resulting components.

The heater tray 104 may include any number of heaters 108. The heaters 108 emit heat towards the powder in the part bed 102, thus heating the powder to the desired temperature for product formation. In an exemplary embodiment, the heater tray 104 includes eight heaters 108, however, any number of heaters may be used. The eight heaters 108 may be configured on the heater tray 104 to include one heater for each corner and one heater for each side of the heater tray. The heaters 108 may be repositioned or adjusted on the heater tray 104 to provide an even heat distribution to the powder on the part bed 102. For example, in some embodiments, a heater 108 may translate along a plane in a side to side or fore to aft direction, or it may rotate about a mounting point near the heater tray 104 and therefore direct heat to the optimal portion of the part bed 102. The heaters 108 may be in connection with variable resisters 112 and a power source 114 to control the energy output of the heaters 108. Further, each heater 108 may have an adjustable current or voltage applied to the heat radiator to variably control the local energy density applied to the powder in the part bed 102.

In some embodiments, the heaters 108 are quartz rod elements, which are stable at temperatures in excess of 400° Celsius. In an exemplary embodiment, the heaters 108 may produce and maintain a consistent and stable temperature between 20° Celsius and 400° Celsius. Of course, in alternate embodiments, any suitable heating elements operable over any desired operating ranges may be used.

The environment 100 further includes an infrared (IR) camera 116 to capture images that indicate the temperature distribution across the powder in the part bed 102. The IR camera 116 may be any thermal imaging device capable of measuring the temperature distribution of the powder on the part bed 102 and outputting temperature distribution data. The IR camera 116 may, for example, infer temperature from the measured infrared intensity by assuming the powder emits infrared radiation according to an established model of radiant intensity (e.g. black body emitter, etc.). In some embodiments, the IR camera 116 may be suspended above the part bed 102 and directed approximately perpendicular to the powder surface, thus being pointed directly at the powder bed to capture temperature (or heat) distribution data.

The IR camera 116 may have an energy wavelength detection band (or range) that is outside the energy wavelength band of the laser 106. This may allow the IR camera 116 to monitor the temperature of the powder while the laser 106 is scanning the product, thus the data captured by the IR camera 116 may not be instantaneously affected by the laser's energy output.

The data captured by the IR camera 116 may be used to generate a zone heat distribution 118. The zone heat distribution 118 is a representation of the temperatures for each zone corresponding to the part bed. Each heater 108 influences the temperature of at least one zone. For example, the second heater 108(2) may be adjusted to increase or decrease the temperature of zone 2 in the zone heat distribution 118. The temperature of the second heater 108(2) may also influence the temperature of the adjacent zones 5, 6, and 9. Although the zone heat distribution 118 depicts nine zones, the temperature gradient of the powder on the part bed 102 may be divided into any number of temperature zones.

In an embodiment, the IR camera 116 outputs temperature distribution data in the form of pixilated data. The zone heat distribution 118 may be created by the IR camera 116, such as by algorithms that output the captured data by zones. The zones may include one or more pixels compiled to create a temperature for each zone. In another embodiment, the IR camera 116 data may be processed by software to create the zone heat distribution 118. A central processing unit (CPU) 120, such as a computer, may be utilized to analyze the distribution 118 to determine the temperatures associated with each zone. In some embodiments, the temperatures may be calculated using an average, median, root mean square, or other zone temperature calculation to generate a single temperature for each zone in the zone heat distribution 118.

As further shown in FIG. 1, the CPU 120 may analyze the data from the zone heat distribution 118 and generate an individual zone control output 122. The zone control output 122 may be utilized to reposition the heaters 108 (e.g., translate side to side, fore to aft, rotate), adjust the power source, or adjust the resistance to produce a desired temperature distribution over the powder in the powder bed, including a uniform or non-uniform distribution. It will be appreciated that for many applications, a uniform, approximately constant temperature across the powder in the part bed is desired. For example, the CPU 120 may determine that zone 2 is 4° C. warmer than a target temperature (e.g., 163° C.) in the zone heat distribution 118. The CPU 120 may then reduce the temperature in zone 2 by performing one or more of the following: increasing the resistance from the variable resistors 112, reducing the power source 114 for the heater (or heaters) 108 associated with zone 2, and repositioning one or more heaters 108, including the second heater 108(2) that may be located directly proximate to zone 2. After one or more of the previously described adjustments occur, the temperature of zone 2 should be equivalent to a target temperature according to the desired temperature distribution.

The CPU 120 may include one or more processors 124 that are coupled to instances of a user interface (UI) 126. The UI 126 represents any devices and related drivers that enable the CPU 120 to receive input from a user, system, or device (e.g., signal from the IR camera 116), and to provide output to the user, system, or process. Thus, to receive inputs, the UI 126 may include keyboards or keypads, mouse devices, touch screens, microphones, speech recognition packages, imaging systems, or the like in addition to networking connection from other devices such as the IR camera 116. Similarly, to provide outputs, the UT 126 may include speakers, display screens, printing mechanisms, or the like in addition to networking connections to other devices such as the variable resistors 112, the power source 114, and the heaters 108.

The CPU 120 may include one or more instances of a computer-readable storage medium 128 that are addressable by the processor 124. As such, the processor 124 may read data or executable instructions from, or store data to, the storage medium 128. The storage medium 128 may contain a number of modules 130 (e.g., a module A and a module B) which may be implemented as one or more software modules that, when loaded into the processor 124 and executed, cause the CPU 120 to perform any of the functions described herein. In one embodiment, the module A may receive a signal from the IR camera 116, process the signal, and create the zone heat distribution 118. In a further embodiment, the module B may create and execute the zone control output 122 by manipulating the heaters 108 as described above. Additionally, the storage medium 128 may contain implementations of any of the various software modules described herein.

With continued reference to FIG. 1, the environment 100 may further include other devices for measuring the temperature of the powder in the part bed 102 to create the zone heat distribution 118. For example, thermocouples 132 may be positioned within, or adjacent to, the part bed 102 to measure the temperature of the powder. Other devices may be used in conjunction with the IR camera 116, or they may be used as a substitute for the IR camera 116, to measure the temperature of the powder in the part bed 102.

The variable resistors 112, the power sources 114, and the heaters 108 may be arranged in different configurations. In some embodiments, each heater 108 may be configured with its own variable resistors 112 and power source 114. In other embodiments, the heater 108 may share a common set of variable resistors 112, a common power source 114, or both. Additionally, the variable resistors 112, the power sources 114, and the heaters 108 may be configured in a series or parallel. Other configurations of these elements which facilitate the functionality described herein are also contemplated.

FIGS. 2a, 2b, and 2c illustrate different temperature distribution ranges 202, 204, 206, respectively, for a part bed in accordance with an embodiment of the invention. The temperature distribution ranges 202, 204, 206 are generated by plotting the temperature of the powder in the part bed to create a three-dimensional graphical representation of the temperature distribution across the powder. The part bed has an area enclosed by part formation borders 208, 210, 212 that circumscribes the area for temperature control. Products are created within the part formation borders 208, 210, 212 where the temperature may be maintained in accordance with a desired (or target) temperature distribution. The temperature of the zone outside of the border is not relevant to the process.

In some embodiments, the desired temperature distribution of the part bed is approximately constant across the zone heat distributions (or heat gradient), and thus a graphical representation depicts an approximately flat surface on a profile 214, 216, 218. When the part bed has an inconsistent or uneven temperature distribution of the powder in the part bed, the graphical representation will appear inconsistent with features 220, 222 including dips, valleys, ridges, elevations and other non-uniformities that represent inconsistencies of the temperature across the powder in the part bed. In comparison, the temperature distribution range 206 in FIG. 2c is relatively flat and thus has no significantly distinct features on the surface 224. This indicates an approximately constant temperature of the powder in the part bed. In contrast, the temperature distribution range 202 in FIG. 2a has a curved profile 214 and distinct features 220 representing large inconsistencies in temperature across the powder in the part bed. For example, the temperature distribution range 202 may be a graph of the temperature distribution before control and adjustment. Further, the temperature distribution range 204 in FIG. 2b has a relatively flat profile 216, but still contains distinct features 222 representing large inconsistencies in temperature across the powder in the part bed. For example, the temperature distribution range 204 may be a graph of the temperature distribution after an initial or rough adjustment, or before equilibrium across the part bed has been reached. Therefore, the temperature distribution range 206 depicts a desired (or target) temperature distribution using the methods and systems for controlling and adjusting heat distribution over a part bed as disclosed herein.

FIGS. 3a and 3b are top plan views from an IR camera perspective of temperature distributions 302, 304, respectively, of a part bed including zones in accordance with another embodiment of the invention. The temperature distributions 302, 304 depict variations in the temperature across the powder and is represented by color or gray-scale variances (i.e., consistent color or shading equates to an even temperature). The temperature distribution 304 in FIG. 3b, utilizing the methods and systems for controlling and adjusting heat distribution over a part bed as disclosed herein, depicts a desired (or target) temperature distribution that is more consistent temperature across the part bed than the temperature distribution 302 in FIG. 3a.

In FIG. 3a, the part bed has a part formation border 306 circumscribing multiple heater zones 308. In one embodiment, the nine heater zones 308 are utilized for controlling and adjusting heat distribution over a part bed, however, fewer or more zones may be utilized. The temperature distribution 302 illustrates the powder temperature before adjustment of the heaters, and includes a warmer temperature at a first point 310 (light color/shade) and a cooler temperature at a second point 312 (dark color/shade), thus illustrating a relatively inconsistent temperature distribution 302. In FIG. 3b, the part bed has a part formation border 314 circumscribing multiple heater zones 316. The temperature distribution 304 illustrates the powder temperature after adjustment of the heaters, with a first point 318 that has a substantially similar (or approximately constant) temperature as a second point 320. Therefore, unlike the temperature distribution 302 in FIG. 3a, the temperature distribution 304 in FIG. 3b illustrates a relatively consistent temperature distribution 304.

Figure 4:
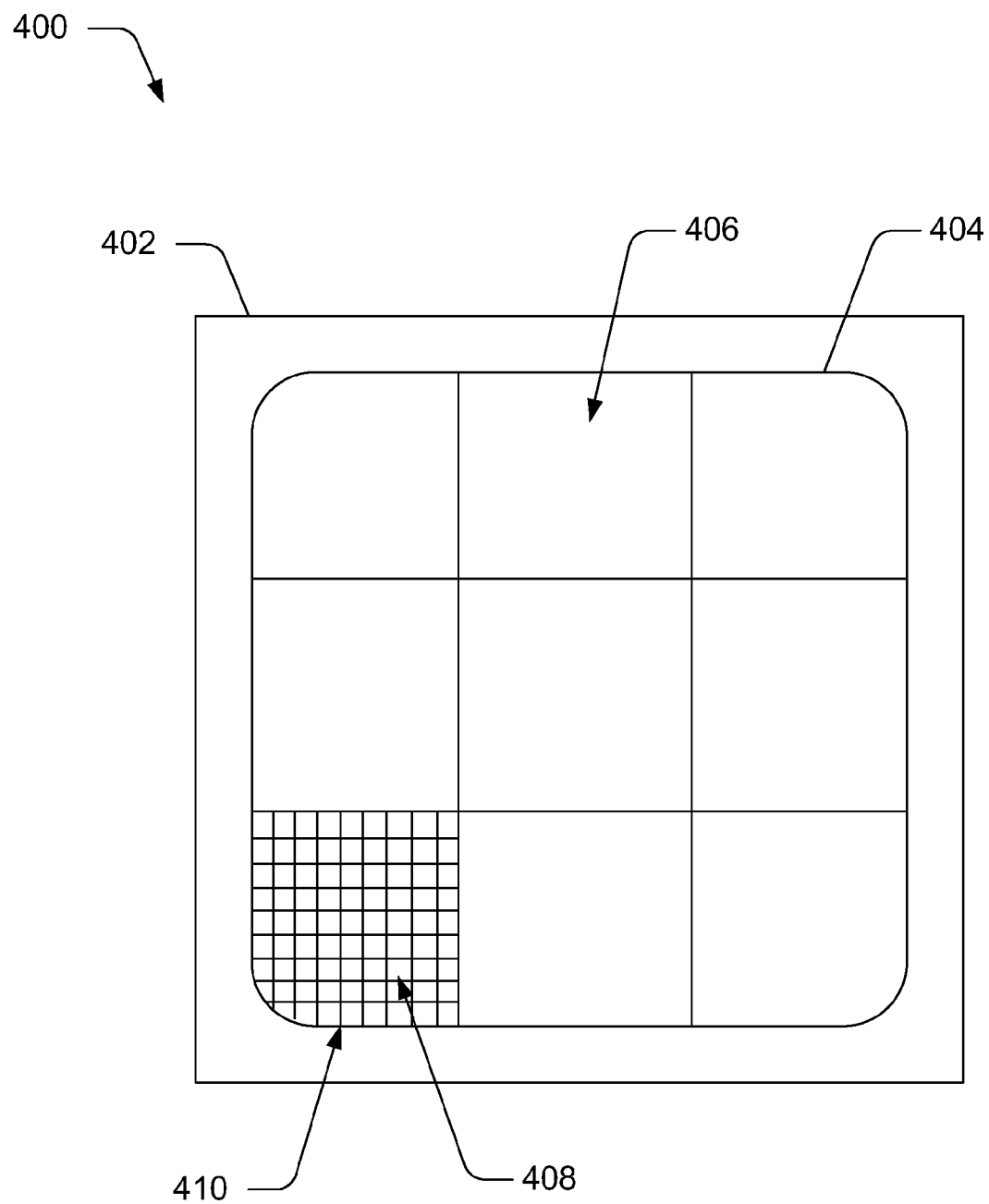
FIG. 4 is a schematic of an exemplary zone grid configuration of a part bed in accordance with an embodiment of the invention.

FIG. 4 is a schematic of an exemplary zone grid 400 of a part bed in accordance with an embodiment of the invention. The zone grid 400 overlays a part bed 402 that further includes a product formation border 404. As previously described, parts are formed within the product formation border 404 where the temperature is controlled to a desired (or target) temperature distribution. For example, in a particular embodiment, the zone grid 400 may be divided into nine zones 406. Each of the nine zones 406 may be further divided into a 9×9 grid of sub-zones 408, thus the zone grid 400 may have 27×27 sub-zones. The IR camera may capture data relating to the measurement of the temperature for each sub-zone 408. For example, the IR camera may capture pixilated data points which correspond to the sub-zones 408. The data points may then be used to create a temperature zone grid, such as the zone heat distribution 118 in FIG. 1. In an embodiment, the temperatures of the sub-zones 408 for each of the nine zones 406 may be averaged to create a temperature for each of the nine associated zones 406. For example, the eighty-one temperature sub-zones 408 in a zone 410 may be averaged to create a single temperature for the zone 410.

Figure 5:
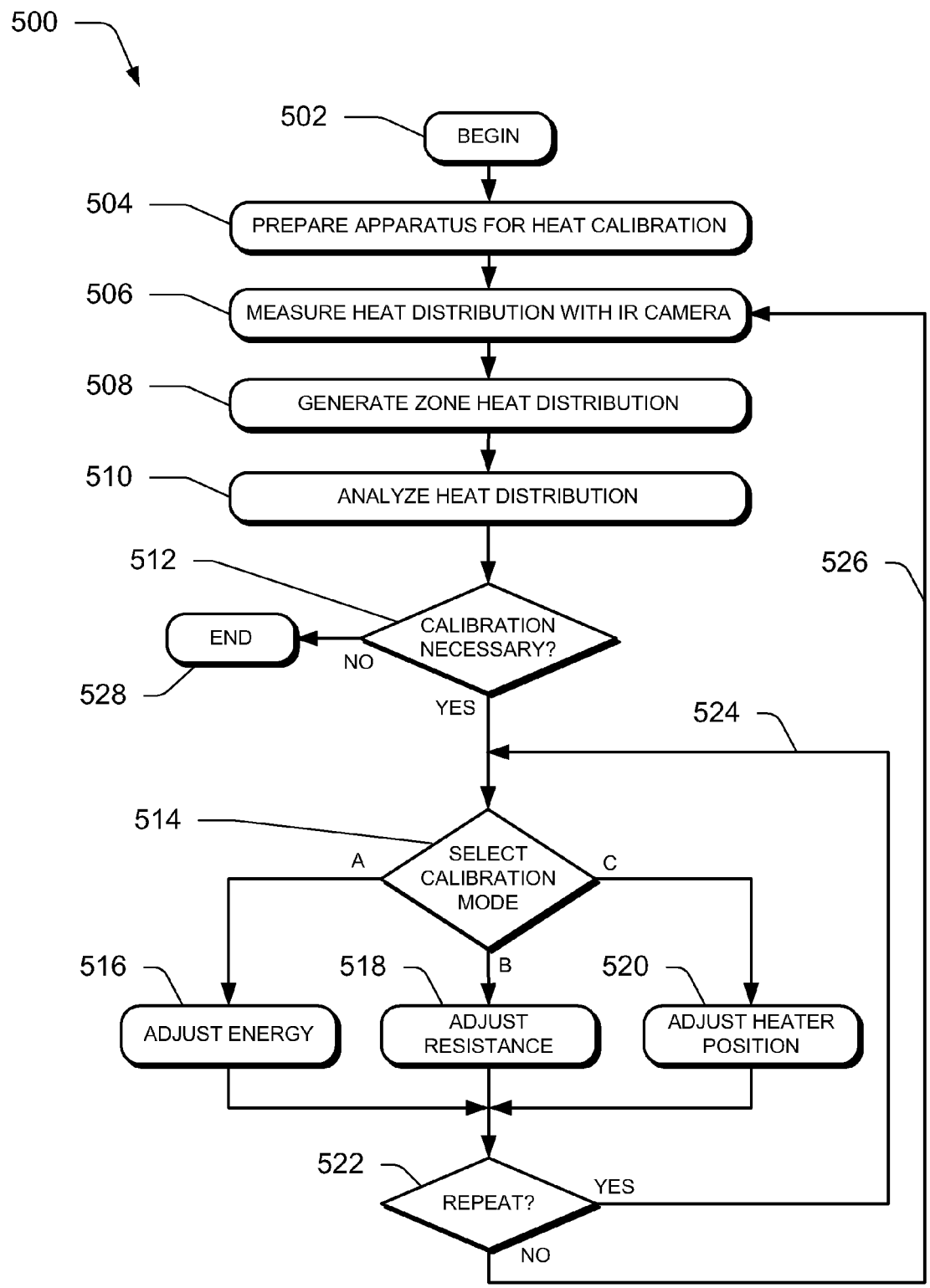
FIG. 5 is a flow chart of a method for controlling and adjusting the heat distribution over a part bed in accordance with another embodiment of the invention.

FIG. 5 is a flow chart of a method 500 for controlling and adjusting the heat distribution over a part bed in accordance with another embodiment of the invention. The method 500 begins at a block 502. At a block 504, the apparatus is prepared for control and adjustment of the heaters to provide a desired temperature distribution over the powder in the part bed. The preparation may include removing any parts from an additive manufacturing equipment that may interfere with the operation of the heaters. Additionally, the additive manufacturing equipment may include mirrors that direct or position the beam of the laser 106 within the part bed 102. These mirrors may require removal or relocation during the operation of the heaters. Additional parts may also need to be removed or relocated at the block 504.

In addition to removing and relocating parts of the additive manufacturing equipment, the part bed must also be prepared for a simulated process run at the block 504. This may include selecting part build locations and distribution one or more thin layers of powder across the part bed. For example, the part bed may be prepared by creating a base of a part by completing the first 10 layers of the product(s). Providing a partial product build may improve the operation of the heaters and thus create a more even temperature distribution over the part bed because temperature variances induced by the product formation are taken into account in the process.

At a block 506, after the part bed has been heated, the heat distribution is measured with the IR camera. The heat distribution may also be measured by other temperature extracting devices such as by thermocouples or other heat sensing devices. Data is collected from the temperature measurement at the block 506 which is utilized to generate a zone heat distribution at a block 508. With reference to FIG. 1, the zone heat distribution 118 may include a grid of temperatures, one for each temperature zone. For example, an IR camera may output pixilated data that is converted to a zone heat distribution at the block 508.

At a block 510, the heat distribution is analyzed. The analysis may be performed by the CPU 120. For example, an analysis module may be executed by the CPU 120 to calculate any adjustments necessary to the heaters to provide a desired temperature distribution (uniform or non-uniform) across the powder in the part bed. At a decision block 512, the method 500 determines if the heaters need to be calibrated. The heaters may be adjusted if a zone is outside a predetermined threshold for the zones in relation to a target temperature. For example, the heaters may be adjusted if the zone heat distribution has a variance of temperature greater than two degrees Celsius from the target temperature. Because some temperature variance may always be present across the powder, an adjustment threshold may be established to provide a temperature distribution within acceptable predetermined tolerances.

If an adjustment is necessary at the decision block 512, then at a decision block 514 the method 500 selects an adjustment mode via routes A, B, or C. At a block 516 via route A, the energy input to the heaters is adjusted to individually change the input energy of one or more heaters that require adjustment. The energy input may be adjusted by changing the voltage supplied to the heaters by a power source. The electrical current applied to the heaters may also be varied to control the heat emitted from the heaters and directed to the powder in the part bed. Additionally, the energy may be pulsed to the heaters using a variable duty cycle, such that the heat provided by a heater is a function of the pulsating operation of the heater. In one embodiment, each heater is individually controlled and includes a separate power source.

At a block 518 via route B, the resistance is adjusted to change the resistance of individual heaters and thus alter the heat output of one or more of the heaters. For example, a varistor or rheostat may be utilized to change the resistance of the circuit which includes the heater, thus adjusting the heat output realized across the powder in the part bed.

At a block 520 via route C, the heaters are repositioned to redirect the heat generated by one or more heaters onto the powder in the part bed. At a decision block 522, the method 500 determines if another adjustment mode is requested (or required). If so, the method 500 returns to the decision block 514 via route 524 and the heaters are adjusted again. For example, in an iteration of the method 500, both the resistance at the block 518 and the heater position at the block 520 may be adjusted to control the heaters and generate a target temperature distribution across the powder in the part bed.

The adjustment modes selected from the decision block 514 may include manual adjustments or automatic (system generated) adjustments. For example, at the block 520, an operator may reposition the heaters manually or the heaters may be repositioned by actuators in communication with a CPU or other controller and be repositioned automatically. In addition, the adjustments may be performed either open loop or using closed-loop feedback control.

At the decision block 522, if it is determined that the adjustment process need not be repeated, the method 500 returns via route 526 to the block 506 to measure the heat distribution again. Moving ahead to the decision block 512, if the method 500 determines that further control and adjustment of the heaters is not necessary (e.g., all of the zone heat distribution zones are within tolerance), then the method may move to a block 528 and end. The block 528 may include repositioning or reattaching any parts of the additive manufacturing equipment necessary as a result of the actions included in the block 504.

Figure 6:
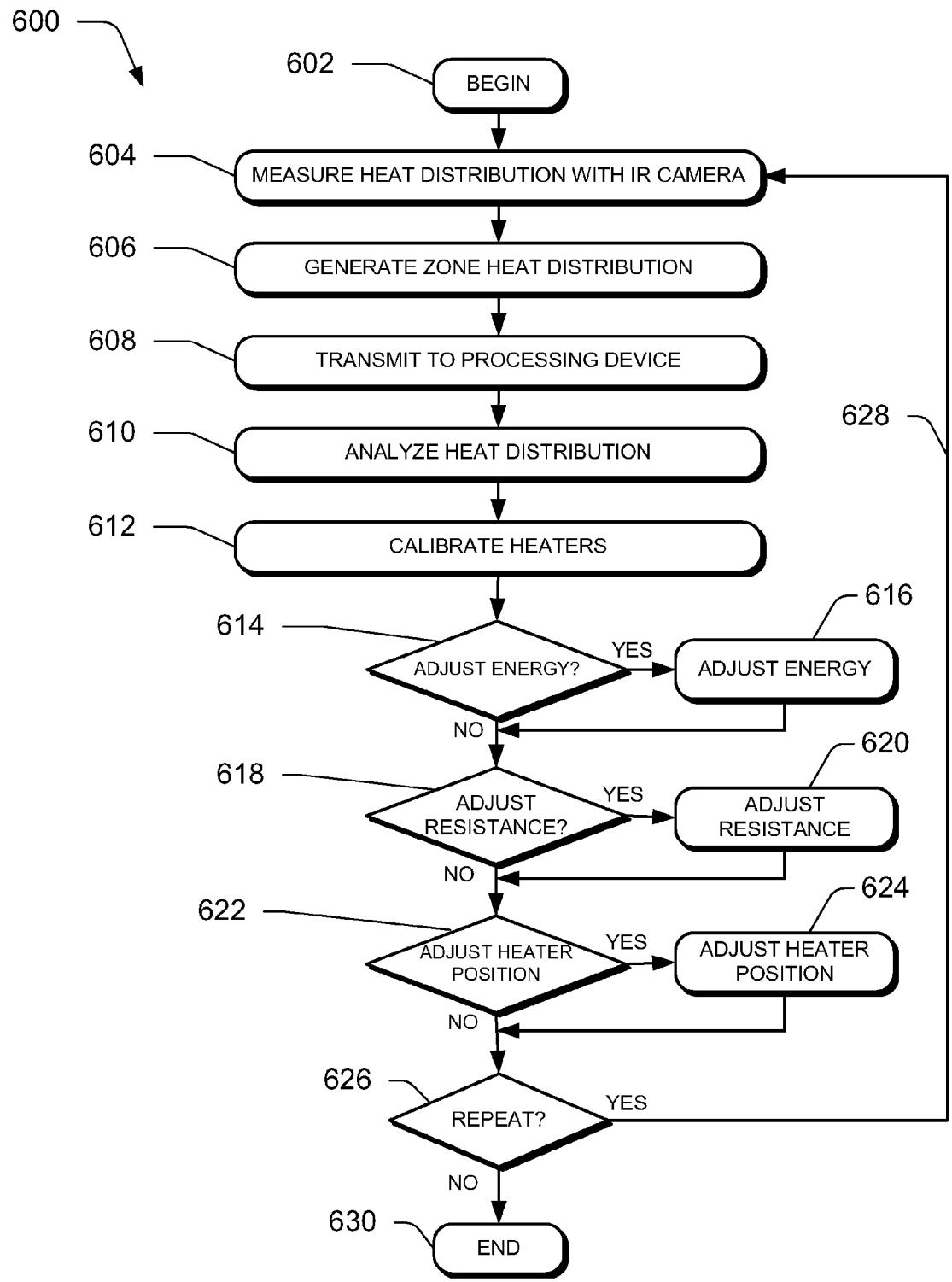
FIG. 6 is a flow chart of a closed loop process for controlling and adjusting the heat distribution over a part bed in accordance with another embodiment of the invention.

FIG. 6 is a flow chart of a closed loop process 600 for controlling and adjusting the heat distribution over a part bed in accordance with another embodiment of the invention. The process 600 begins at a block 602. At a block 604, the heat distribution is measured with the IR camera. Data is collected from the measurement at the block 604 which is utilized to generate a zone heat distribution at a block 606. The data from the zone head distribution is transmitted to the processing device. In some embodiments, the CPU 120 may have a first module (module A) that generates the head distribution and a second module (module B) that receives the output from the first module. The second module may then perform the functionality of a block 610 and analyze the heat distribution obtained at the block 606. In another embodiment, software executed by the IR camera may generate the zone heat distribution at the block 606, and then transmit the data to the CPU 120 for analysis.

At a block 612, the heater control and adjustment begins. At a decision block 614, the process 600 determines if the power source of one or more heaters needs adjustment. If the power source requires adjustment, at a block 616, the energy is adjusted and the process 600 continues to a decision block 618, otherwise the process continues to the decision block 618 without adjusting the energy output of any of the heaters.

At a decision block 618, the process 600 determines if the resistors corresponding to individual heaters need adjustment. If the resistance requires adjustment, at a block 620, the resistance is adjusted and the process 600 continues to a decision block 622, otherwise the process continues to the decision block 622 without adjusting the resistance of any of the heaters.

At a decision block 622, the process 600 determines if one or more heaters require repositioning. If the heaters need repositioning, at a block 624, one or more heaters are repositioned and the process 600 continues to a decision block 626, otherwise the process continues to the decision block 626 without repositioning any of the heaters.

At the decision block 626, the process 600 may be repeated via route 628 and therefore provide a closed loop system. For example, the process 600 may be run at specific time iterations or during a point in the process of additive manufacturing, such as right after a new thin layer of powder is applied to the part bed. Therefore, the process 600 may continually adjust the heaters during product formation by continually monitoring the temperature distribution of the powder in the part bed and making the necessary adjustments at the blocks 614, 620, and 624 to control and adjust the heaters, and thus, the temperature distribution. If the process is not repeated, such as when the products are complete and no more powder is distributed in the part bed, the process 600 may end at a block 630.

In an exemplary control and adjustment of the heaters, the analysis of the zone heat distribution may identify the zone with the lowest temperature. For example, in FIG. 1, zone 1 and zone 3 in the zone heat distribution 118 depict a temperature of 159° C. The CPU 120 may then create adjustments to the variable resistors 112 (e.g., increase the resistance) and reposition the heaters to reduce the temperature in the other zones to that of the coldest zones (zones 1 and 3 at 159° C.). In a final step, the CPU 120 may increase/decrease the energy to the heaters to raise/lower the temperature of all the heaters to obtain a target temperature.

Generally, any of the functions described herein can be implemented using software, firmware (e.g., fixed logic circuitry), analog or digital hardware, manual processing, or any combination of these implementations. The terms "module," "functionality," and "logic" generally represent software, firmware, hardware, or any combination thereof. In the case of a software implementation, the module, functionality, or logic represents program code that performs specified tasks when executed on processor(s) (e.g., any of microprocessors, controllers, and the like). The program code can be stored in one or more computer readable memory devices. Further, the features and aspects described herein are platform-independent such that the techniques may be implemented on a variety of commercial computing platforms having a variety of processors.

Methods and systems for controlling and adjusting heat distribution over a part bed in accordance with the teachings of the present disclosure may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

In further embodiments, the methods and systems for controlling and adjusting heat distribution over a part bed may allow for a part bed of increased dimensions. For example, in some embodiments, part beds may be approximately 31 centimeters (13 inches) by 36 centimeters (15 inches). This size part bed, however, restricts the size of the part that may be formed utilizing the additive manufacturing techniques. By implementing the methods and systems disclosed herein, any size part bed is obtainable because the temperature distribution may be held at a desired uniform or non-uniform distribution by individually controlling a plurality of heaters to individually heat each zone of the part bed.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method, comprising:
   determining a temperature distribution within a part bed by capturing an infrared image of the part bed and analyzing the infrared image to infer the temperature distribution;
   illuminating a powder within the part bed with a laser to transform the powder from a solid state to a liquid state simultaneous to the capturing the infrared image of the part bed;
   generating a zone heat distribution for one or more heat zones from the temperature distribution;
   analyzing the zone heat distribution to create an adjustment command to control at least one heater for providing a desired temperature distribution within the part bed; and
   adjusting the at least one heater based on the adjustment command.

2. The method of claim 1, wherein the desired temperature distribution includes an approximately uniform temperature distribution within a predetermined temperature threshold of a target temperature.

3. The method of claim 1, wherein adjusting the at least one heater based on the adjustment command includes adjusting an orientation of the at least one heater.

4. The method of claim 3, wherein the temperature distribution in determined by an IR camera.

5. The method of claim 1, wherein
   capturing an infrared image of the part bed includes capturing a two dimensional image of infrared radiant intensity emanating from the powder within the part bed, and
   analyzing the zone heat distribution to create an adjustment command includes creating an adjustment signal that controllably adjusts at least one of outputs and locations of a plurality of heating elements to provide a desired two dimensional temperature distribution.

6. The method of claim 1, wherein the adjustment command is at least one of:
   a command to reposition a heater;
   a command to adjust an energy supply for a heater; and
   a command to adjust a resistance for a heater circuit.

7. The method of claim 1, wherein generating a zone heat distribution includes averaging pixilated temperature distribution data to create the one or more heat zones.

8. One or more computer readable media comprising computer-executable instructions that, when executed by a computer, perform acts comprising:
   measuring a temperature distribution of a part bed;
   generating temperature zones from the temperature distribution; and
   creating a heater adjustment command from the temperature zones to adjust at least one of a plurality of heaters to provide a desired temperature distribution over the part bed, wherein the heater adjustment command includes a command to adjust a position of the heater by at least one of rotating the heater about a mounting axis and moving the heater along a plane parallel to the heater bed.

9. One or more computer readable media as in claim 8, wherein generating temperature zones from the temperature distribution includes creating average temperatures for each temperature zone from pixilated data points in the temperature distribution.

10. One or more computer readable media as in claim 8, wherein measuring a temperature distribution of a part bed includes capturing an infrared image of the part bed, and analyzing the infrared image to infer the temperature distribution.

11. One or more computer readable media as in claim 10, wherein the acts further comprise, simultaneously with capturing an infrared image of the part bed, illuminating a powder within the part bed with a laser to transform the powder from a solid state to a liquid state.

12. One or more computer readable media as in claim 8, wherein measuring a temperature distribution of a part bed is performed by controlling an IR camera.

13. One or more computer readable media as in claim 8, wherein creating a heater adjustment command includes at least one of changing the resistance of a heater circuit and adjusting the plurality of heaters to obtain a target temperature for each temperature zone.

14. One or more computer readable media as in claim 8, wherein measuring a temperature distribution of a part bed and product formation in the part bed occur substantially simultaneously.

15. A system, comprising:
a thermal imaging device to generate temperature distribution data from material in a part bed; and
a processor to receive the temperature distribution data, convert the temperature distribution data into a zone temperature grid, create a heater control command based on the difference between a target temperature and the zone temperature grid, and transmit the heater control command to at least one heater element of a plurality of heater elements, wherein the processor includes a first module to convert the temperature distribution data into a zone temperature grid by averaging the temperatures of sub-zones within each zone of the zone temperature grid.

16. The system of claim 15, wherein the thermal imaging device is an IR camera.

17. The system of claim 15, wherein the heater element includes at least one of:
an actuator to reposition the heater;
a variable resistor; and
a power source.

18. The system of claim 15, wherein the processor further commands a laser to illuminate portions of the part bed to transform the powder from a solid state to a liquid state.

19. The system of claim 15, wherein the processor includes a second module to create a heater control command based on the target temperature and the zone temperature grid.

20. The system of claim 15, wherein the heater control command includes instructions to manually adjust at least one heater.

* * * * *